US008984130B1

(12) United States Patent
Gandhi et al.

(10) Patent No.: US 8,984,130 B1
(45) Date of Patent: *Mar. 17, 2015

(54) TRACKING CONTENT ACROSS THE INTERNET

(71) Applicant: Google Inc., Mountain View, CA (US)

(72) Inventors: Kawaljit Gandhi, San Francisco, CA (US); Julien Borel, Menlo Park, CA (US); Chase Martin Hensel, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/933,886

(22) Filed: Jul. 2, 2013

Related U.S. Application Data

(63) Continuation of application No. 12/900,332, filed on Oct. 7, 2010, now Pat. No. 8,499,073.

(51) Int. Cl.
*G06F 15/173* (2006.01)
*H04L 29/08* (2006.01)

(52) U.S. Cl.
CPC ................................... *H04L 67/22* (2013.01)
USPC ........................................ 709/224; 709/223

(58) Field of Classification Search
CPC ....................... G06F 17/3089; H04L 65/4084
USPC ......... 709/219, 227, 235, 203, 217, 223, 224, 709/226, 229; 707/100, 104, 1; 705/14.5; 725/46; 726/22
See application file for complete search history.

(56) References Cited

U.S. PATENT DOCUMENTS

| | | | |
|---|---|---|---|
| 2006/0248063 A1 | 11/2006 | Gordon | |
| 2007/0180523 A1* | 8/2007 | Jablonski et al. | 726/22 |
| 2007/0288518 A1* | 12/2007 | Crigler et al. | 707/104.1 |
| 2008/0250035 A1* | 10/2008 | Smith et al. | 707/100 |
| 2009/0319672 A1* | 12/2009 | Reisman | 709/227 |
| 2010/0146144 A1* | 6/2010 | Audenaert et al. | 709/235 |
| 2010/0287589 A1* | 11/2010 | Stiers | 725/46 |
| 2011/0055352 A1* | 3/2011 | Choi et al. | 709/219 |
| 2011/0251878 A1* | 10/2011 | Subramanian et al. | 705/14.5 |
| 2012/0004958 A1* | 1/2012 | Bloom et al. | 705/14.4 |

\* cited by examiner

*Primary Examiner* — Quang N Nguyen
(74) *Attorney, Agent, or Firm* — Fish & Richardson P.C.

(57) ABSTRACT

System, methods and articles of manufacture for tracking content across an Internet. An embodiment comprises receiving the content from a content source, wherein the content includes a unique content identifier, injecting the content into a content aggregation system, retrieving the unique content identifier from the content, analyzing the content based on the unique content identifier and data in the content aggregation system, and generating a report of the analyzed content.

17 Claims, 7 Drawing Sheets

TRACKING CONTENT ACROSS THE INTERNET

This application is a continuation of U.S. patent application Ser. No. 12/900,322, filed Oct. 7, 2010, now U.S. Pat. No. 8,499,073, issued Jul. 30, 2013, which is incorporated by reference herein in its entirety.

BACKGROUND

1. Field

The field generally relates to the Internet.

2. Background Art

The emergence and development of computer networks and protocols, including the Internet and the World Wide Web (or simply "web" or 'Web"), has allowed many users to view and enjoy content served from remote locations over the web. When content, such as news content or media content, is distributed across the Internet or the Web, the content is published and re-published by multiple content sources. When the content contains popular, "hot" or interesting subject matter the content is likely to be republished by multiple content sources. The content is also likely to be accessed by a greater number of people and for a long period of time.

However, since numerous venues or content sources publish and republish content, conventional content providers cannot easily track their content across the Internet. Although content providers and publishers can determine some content sources that have republished the content using a brute force approach of comparing the original text of the content with text published at different content sources, they cannot easily or meaningfully track and analyze the content as it is republished by multiple content sources. Content providers further lack insight into flow characteristics of content being spread across the Internet and cannot gauge the popularity of content across the Internet or the rate and timing of content publication carried out by other content sources.

BRIEF SUMMARY

Embodiments of the invention include a computer implemented method for tracking content across the Internet or the World Wide Web. The method includes receiving the content from a content source, wherein the content includes a unique content identifier, and injecting the content into a content aggregation system. The method further includes retrieving the unique content identifier from the content, analyzing the content based on the unique content identifier and data in the content aggregation system, and generating a report of the analyzed content. In another embodiment, the content aggregation system may generate and use the content fingerprint to analyze content.

Embodiments further include a system for tracking content across the Internet having a receiver, content aggregator, storage device, and content analyzer. The receiver is configured to receive content from a content source and a predefined user criteria. The content includes a unique content identifier and is accessible to users using the Internet. The content aggregator is configured to aggregate content information from the plurality of content sources. The storage device is configured to store content and content source information. The content analyzer is configured to analyze the content information using the unique content identifier, the content source information and the predefined user criteria. In another embodiment, the content aggregator is configured to generate a content fingerprint from the content. The content analyzer is operable to analyze the content information using the content fingerprint. Finally, the report generator is configured to generate a report of the analyzed content.

In another embodiment, an article of manufacture including a computer-readable medium having instructions stored thereon that, when executed by a computing device, cause said computing device to perform operations for tracking content across the Internet.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

Figure 1:
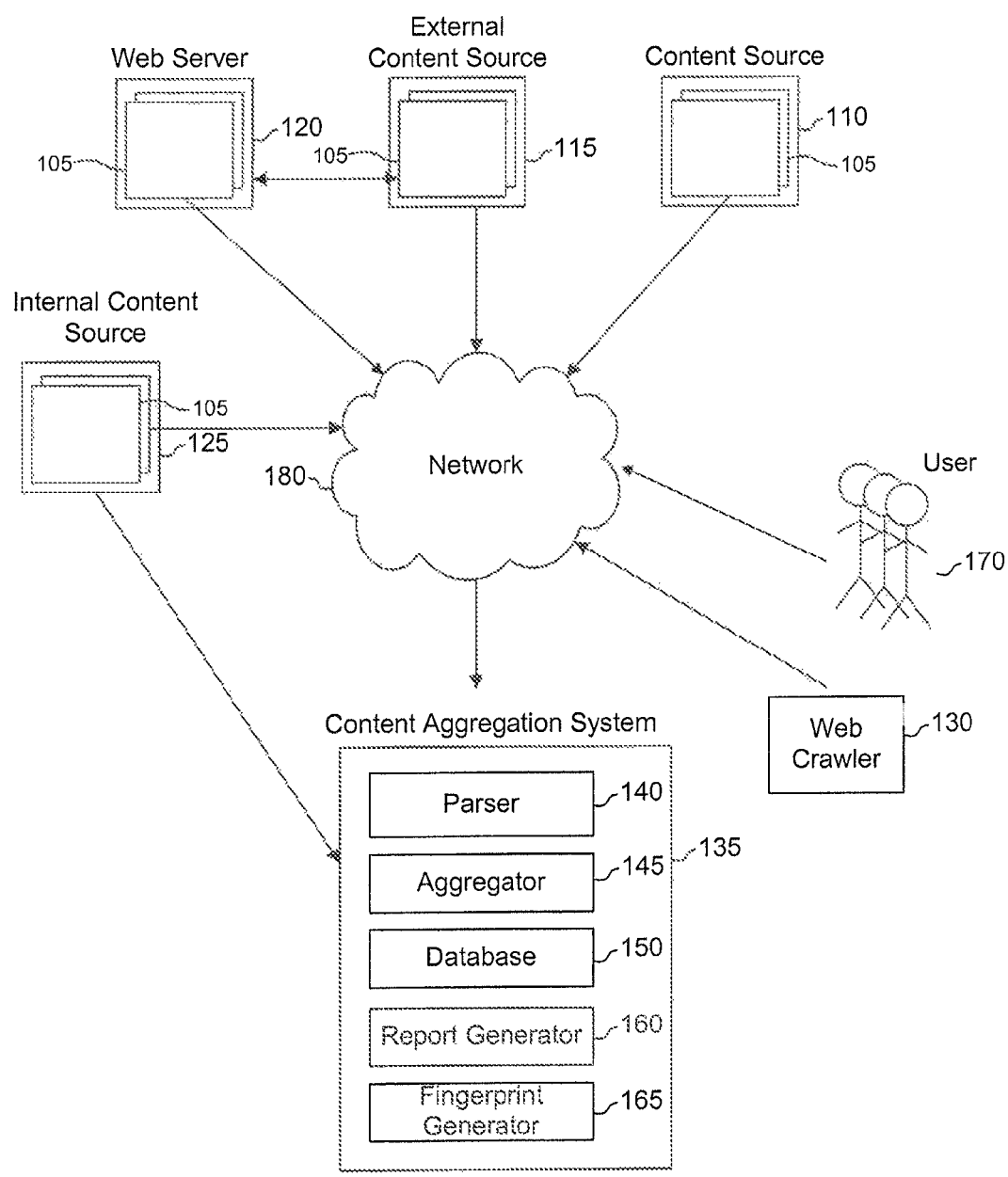
FIG. 1 is an exemplary system environment 100 for content dissemination and tracking.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF EMBODIMENTS

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

Content sources that publish on the Internet, such as media outlets, online news and magazine outlets, blogs, and others, generate millions of articles that are collectively called media content or content. After content is published by an original content source, content is often republished by multiple content sources and website providers across the Internet. When content sources republish the content, individuals are able to obtain the content by accessing one or more of the content sources. As the content is republished by multiple content sources across the Internet a greater number of individuals are able to gain access to the content.

When content is republished by conventional content sources it is difficult to track content. Essentially, to determine if two or more articles include identical content, a word for word comparison between the articles is made. Such comparison is slow, inefficient and complex when multiple sources republish the same content.

When the original content source inserts a unique content identifier into the content information associated with the content it is possible to easily track and analyze content as it is republished across the Internet. In an embodiment, a content fingerprint may be generated from the content or the content information, and can be used to track and analyze content. For example, by using the unique content identifier or the content fingerprint it is possible to determine how quickly content sources republish the content, the number of individuals that have accessed the content at a particular content source and what key words are included in the content that makes the content interesting to the individuals.

FIG. 1 is an exemplary operating environment 100 that disseminates and tracks content. Operating environment 100 includes various content sources, such as a generic content source 110, an external content source 115, a web server 120 an internal content source 125, a web crawler 130, a content aggregation system 135, users or individuals 170 and a network 180.

Content server 110 disseminates content 105 via network 180. In an embodiment, content server 110 may be an original content source for content 105. In yet another embodiment, content server 110 may receive content 105 from another content source 110 and subsequently republish content 105.

In an embodiment, content server 110 may first send content to web server 120. Web server 120 uses network 180 to deliver content 105 in form of web pages to individuals 170 or other content sources 110-125. In an embodiment, web server 120 uses Hypertext Transfer Protocol (HTTP) to deliver content 105 over the Internet. In another embodiment, content server 110 and web server 120 may be housed on the same computer machine or communicate via an internal or external network 180.

External content source 115 is a content source that is external to a provider which hosts content aggregation system 135. In an embodiment, external content source may encompass a generic content source 110 and web server 120.

Internal content source 125 is a content source that is internal to a provider which hosts content aggregation system 135. In an embodiment, internal content source receives content 105 from one or more content sources 110 or web servers 120 via network 180. When internal content source 125 receives content 105, internal content source 125 injects content 105 into a content aggregation system 135 as described herein.

For purposes of this patent application, generic content source 110 encompasses generic properties of content sources 115-125. Therefore, unless specified otherwise, content source 110 describes all content sources 115-125.

Each content source 110 publishes, disseminates and/or republishes content 105. In an embodiment, content 105 is media content, which includes but is not limited to a news, magazine or current events web articles. Content 105 includes also content information. Unlike conventional content generated by conventional content sources, content information associated with content 105 includes a unique content identifier (also called a unique content ID). The unique content ID is inserted into content 105 by content source 110 that is the original source of content 105. In an embodiment, unique content ID may be included in the content information that is provided as metadata.

The unique content ID uniquely identifies content 105 as it is republished by multiple content sources 110. The unique content ID remains with content 105 during its lifetime. Each time content source 110 republishes content 105, the unique content ID does not change.

In an embodiment, content source 110 disseminates content 105 using a news feed. In an embodiment, the news feed uses the NewsML 1.2 standard. The NewsML 1.2 standard is an XML-based standard designed to provide a structural framework for multi-media news. A more detailed description of the NewsML news feed may be found at http://www.nitf.org/nitf-newsml.php.

Content 105 includes content information. In a non-limiting example, content information includes the content delivery date, content source identification, body and title of content 105, and the unique content ID. In an embodiment, the XML-based elements of the NewsML feed contain metadata that includes content information. For example, NewsML may describe a portion of the content information as:

/NewsML/NewsItem: item that represents the document.
/Identification/NewsIdentifier: uniquely identifies the news item.
/ProviderId: news wire agency identification (e.g. 'provider.com').
/DateId: creation date.
/NewsItemId: identifies an article, should stay constant through revisions.
/RevisionId: version number, starts at 1.
/PublicIdentifier: global unique identifier of the document.

In an embodiment, unique content ID may be stored in the /NewsItemId and /PublicIdentifier Tags of the NewsML standard. In another embodiment, the /PublicIdentifer Tag follows the URN format such as:

"urn:newsml:ProviderId:NewsItemId:RevisionId"

In an embodiment, the content information for content 105 is structured in the NITF 3.4 standard. A person skilled in the art will appreciate that the NITF standard is designed to structure news and news like content. Content sources 110 are operable to combine the NITF standard with the NewsML standard to disseminate content 105.

For example, content 105 below may be described in the NewsML and NITF standards as demonstrated below:

<NewsIdentifier>
<ProviderId>provider.com</ProviderId>
<DateId>20020715</DateId>
<NewsItemId>020715214600.i3o0xs0x</NewsItemId>
<RevisionId PreviousRevision="0" Update="N">1</RevisionId>
<PublicIdentifier>urn:newsml:afp.com:20020715:
020715214600.i 3o0xs0x:1</PublicIdentifier>
</NewsIdentifier>

Operating environment 100 also includes network 180. In an embodiment, network 180 is an interconnected system of computer networks, such as the Internet, connected via TCP/IP. Network 180 may include multiple public and private networks that are linked by telephonic or optical technologies. In another embodiment, network 180 is a local network comprising of internal content sources 125 and content aggregation system 135.

Web crawler 130 is a computer module that browses or "crawls" the Internet in an automated and methodical manner. Web crawler 130, begins its "crawl" from a list of identifiable URLs or a URL list. When web crawler 130 visits links in the URL list, web crawler 130 identifiers hyperlinks in the visited URLs and adds those hyperlinks to the URL list. Web crawler 130 continuously visits the URLs in the URL list and is able to identified new or revised content 105. A person skilled in the art will appreciate that web crawler 130 is operable to identify up-to-date content 105 disseminated by content sources 110. After web crawler 130 identifies relevant content 105, content 105 is transmitted to content aggregation system 135. In an embodiment, content 105 is a relevant content when content 105 is published, republished or updated by content source 110.

In an embodiment, web crawler 130 is housed as part of a computer aggregation system 135 or on a separate computer server.

Content aggregation system 135 receives, stores and analyzes content 105 that it receives from content sources 110. Content aggregation system 135 receives content 105 that was identified by web crawler 130. Content aggregation system 135 includes a parser 140, a content aggregator 145, a database 150, a report generator 160, and a fingerprint generator 165. After content aggregation system 135 receives content 105, content aggregation system 135 parsers, stores and analyzes the aggregated content.

Parser 140 is operable to parse content 105 and retrieve the associated content information and the unique content ID. After parser 140 retrieves the content information, content aggregation system 135 passes the content information to content aggregator 145. In an embodiment parser 140 is operable to parse content information transmitted as metadata via NewsML and NITF standards.

Content aggregator 145 aggregates content information from content 105 with content information from other instances of content 105 received from multiple content sources 110. Content aggregator 145 is operable to use the unique content ID to identify identical content 105 that was published and republished by content sources 110. In a non-limiting embodiment, content aggregator 145 may aggregate content information by content source 110 that originally published content 105. In another embodiment, content aggregator 145 may also aggregate content sources 110 that republished content 105, the time that content 105 was republished, the key words that are included in content 105, and other content information that may be included in the metadata associated with content 105. In another embodiment, content aggregator 145 may aggregate content 105 by viewership in a geographic area.

Database 150 is operable to store content information from content 105. Database 150 stores content 105 using the unique content ID. In an embodiment, database 150 is operable to store content information after it is parsed by parser 140. In another embodiment content aggregation system 135 stores content information after it is aggregated by content aggregator 145.

Report generator 160 generates a report based on the content information stored in database 150. In an embodiment, report generator 160 generates a report based on the criteria supplied by user 170. In an embodiment, user 170 may be internal to the provider that hosts content aggregation system 135. In yet another embodiment, user 170 may be external to the provider and request the content report using network 180. In another embodiment, the provider requires the user 170 to subscribe to the content aggregation system 135 prior to being granted access to the content report.

Because database 150 stores content information for content 105 using a unique content ID, report generator 160 is operable to generate a report that tracks content 105 as it is published and republished by content sources 110. In an embodiment, report generator 160 may determine the number of content sources 110 that republished content 105. In another embodiment, report generator 160 may determine how quickly content sources 110 have republished content 105 after it was published by original content source 110. In another embodiment, report generator 160 may determine the viewership of content 105. In another embodiment, report generator 160 may determine the number of individuals 170 that have accessed content 105 from a particular content source 110, from all content sources 110 or in a particular geographic area. In another embodiment, report generator 160 is operable to determine whether an external event increased the viewership of content 105.

In an embodiment, content aggregation system 135 includes a fingerprint generator 165. Fingerprint generator 165 is operable to generate a content fingerprint of content 105. A person skilled in the art will appreciate that the content fingerprint may be used to identify and analyze content 105 in content aggregation system 135.

Fingerprint generator 165 is operable to generate the content fingerprint using different attributes associated with content 105. In an embodiment, fingerprint generator 165 may use the content information included in the metadata to generate the content fingerprint. In another embodiment, fingerprint generator 165 may use part or all of the text associated with content 105 to generate the content fingerprint. In yet another embodiment, fingerprint generator 165 may use the combination of attributes described herein to generate the content fingerprint. A person skilled in the art will appreciate, that the embodiments herein were given by way of example and not limitation and that fingerprint generator 165 may use other ways to generate the content fingerprint.

Content Aggregation

Figure 2:
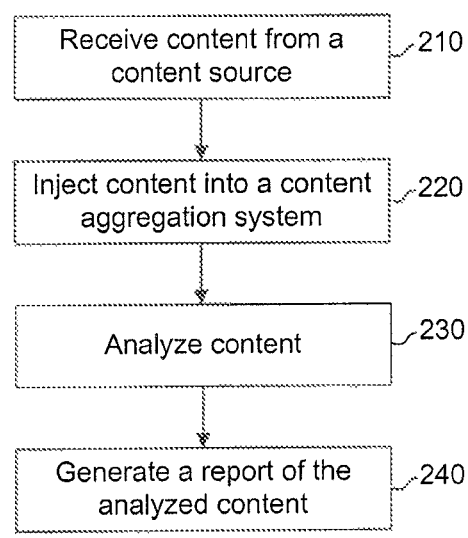
FIG. 2 is a flowchart 200 of a high level overview of the content aggregation system aggregating, tracking and analyzing content generated by multiple content sources.

FIG. 2 is a flowchart illustrating an exemplary embodiment 200 of content aggregation system 135 aggregating and analyzing content 105 across the Internet.

At step 210, content aggregation system 135 receives content 105 from content sources 110. Content aggregation system 135 receives content 105 that web crawler 130 identified as relevant content. In an embodiment, content 105 may be relevant content when content 105 was published by content source 110 and/or republished by content sources 110.

Figure 3:
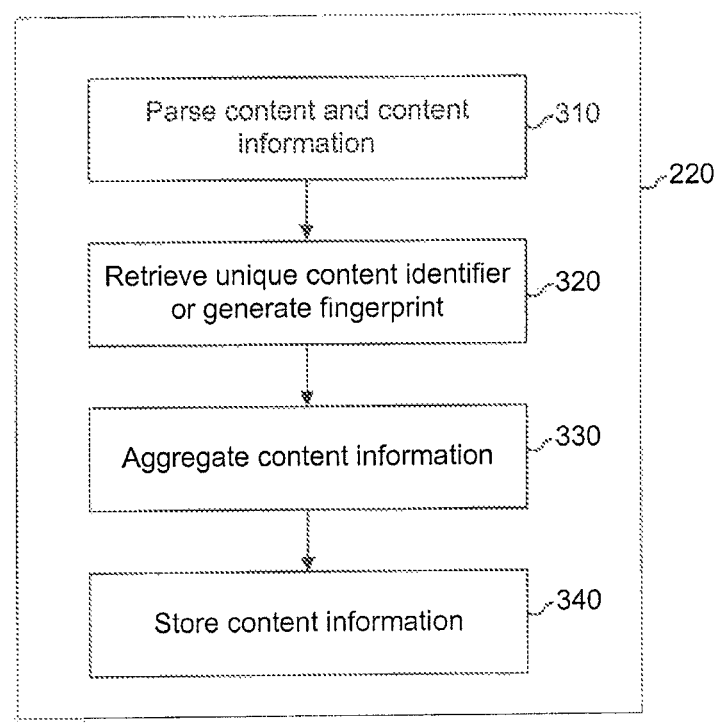
FIG. 3 is a flowchart 300 of the content aggregation system aggregating the content.

At step 220, content 105 is injected into content aggregation system 135. FIG. 3 is a flowchart illustrating an exemplary embodiment 300 of the content injection process.

At step 310, content aggregation system 135 passes content 105 to parser 140. Parser 140 retrieves content information associated with content 105. In an embodiment, content information is included in the metadata associated with content 105. In another embodiment, content 105 and the associated metadata are received via a NewsML and NITF data feed format.

After parser 140 parses content 105 the flowchart proceeds to step 320.

Unlike conventional media content, content 105 includes a unique content ID. At step 320, content aggregation system 135 extracts the unique content ID from content 105. A person skilled in the art will appreciate that step 320 may be performed separately or in conjunction with step 310.

In another embodiment, content aggregation system 135 uses the fingerprint generator to generate the content fingerprint for content 105. As described herein, the content aggregation system 135 is operable to use the content fingerprint to identify and aggregate content 105.

At step 330, content aggregation system 135 passes the parsed content 105 and the unique content ID to content aggregator 145. Content aggregator 145 aggregates parsed content 105 by the unique content ID. In another embodiment content aggregator 145 aggregates the identical content 105 received from multiple content sources 110. A person skilled in the art will appreciate that content 105 may be aggregate in many ways based on the unique content ID and other content information included in content 105.

At step 340, content 105 is saved in database 150. In an embodiment, content 105 may be saved in database 150 prior to and/or after step 340.

Content Analysis and Tracking

Going back to FIG. 2, at step 230, content aggregation system 135 tracks and analyses content 105. Content aggregation system 135 retrieves content 105 stored in database 150, analyzes content 105 according to a criteria defined by user 170, and generates a content report.

Figure 4:
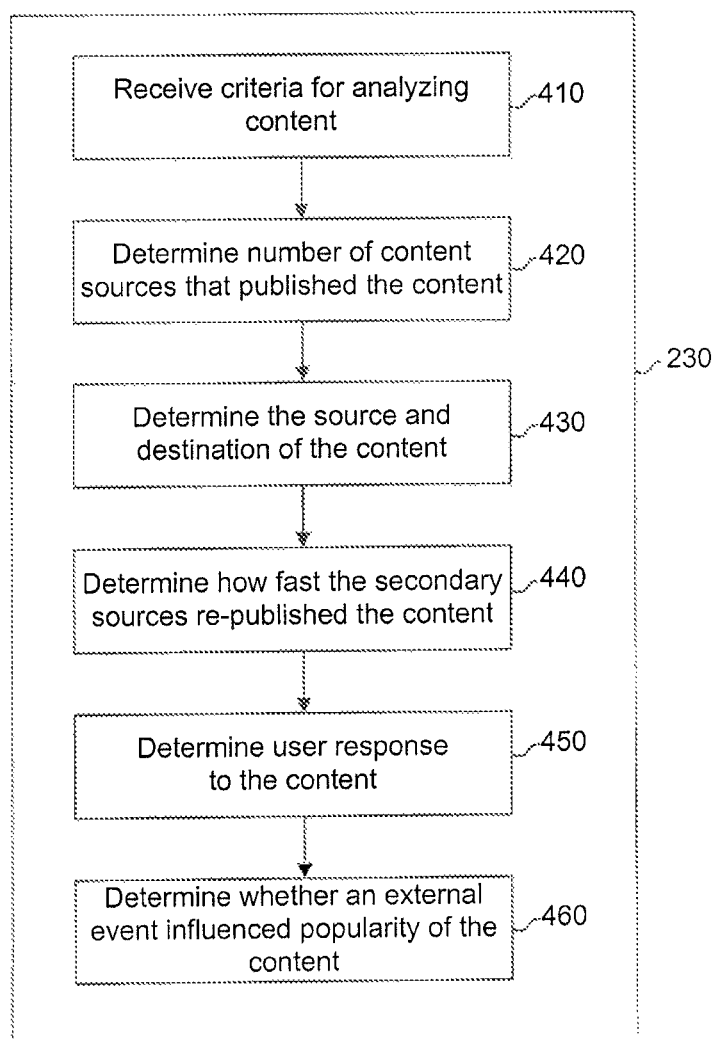
FIG. 4 is a flowchart 400 of the content aggregation system analyzing the content and generating a content tracking report.

FIG. 4 is a flowchart illustrating an exemplary embodiment 400 of content aggregation system 135 analyzing aggregated content 105.

At step 410, content aggregation system 135 receives criteria for analyzing content 105. In an embodiment, user 170 sends the criteria to content aggregation system 135. Based on the user criteria, content aggregation system 135 analyzes content 105. In an embodiment, user 170 may be an authorized user who subscribes to a provider that hosts content aggregation system 135. In another embodiment, user 170 may use content aggregation system 135 via a local network. In yet another embodiment, user 170 may use the Internet to access content aggregation system 135.

In another embodiment, a software module is inserted into content aggregation system 135. The software module is pre-programmed with criteria for analyzing content 105.

Steps 420-460 are non limiting embodiments of the user criteria used to analyze content 105. A person skilled in the art will appreciate that steps 420-460 may be performed out of order or in conjunction with each other. At each step 420-460 content aggregation system 135 retrieves and analyzes content 105 from database 150 and passes content 105 to report generator 160.

In an embodiment, content sources 110 may be separated into content sources that are internal to the provider hosting content aggregation system 135, such as content source 125. In another embodiment, content sources 110 are external to the provider hosting content aggregation system 135, such as content sources 115. Steps 420-460 may be performed using all content source 110, internal content sources 125 or external content sources 115.

At step 420, content aggregation system 135 uses the unique content ID to determine the total number of content sources 110 that have been published and republished content 105.

At step 430, content aggregation system 135 uses the unique content ID to identify the original content source 110. In another embodiment, content aggregation system 135 uses the unique content ID to determine the content sources 110 that have republished content 105. Because the unique content ID remains constant during the lifetime of content 105, content aggregation system 135 matches the unique content ID to content sources 110 that originally published and republished content 105.

At step 440, content aggregation system 135 uses the unique content ID to determine how quickly content sources 110 republished content 135. For example, after original content source 110 has published content 105, multiple content sources 110 may republish content 105 in a matter of minutes, hours, days and weeks. When web crawler 130 continuously retrieves content 105 from content sources 110, content aggregation system 135 is operable to identify how quickly content 105 had spread across the Internet.

At step 450, content aggregation system 135 is operable to use the unique content ID to determine the viewership of content 105. For example, content aggregation system 135 is operable to determine the number of users 170 that viewed content at a particular content source 110, at original content source 110, at content sources 110 that have republished content 105, at internal content sources 125 and at external content sources 115. In an embodiment, content aggregation system 135 is operable to compare similar contents 105 and determine the key words that tend to increase the viewership of content 105. In another embodiment, content aggregation system 135 is operable to determine the viewership of the content 105 in a particular geographic area.

At step 460, content aggregation system 135 is operable to use the unique content ID to determine if an external event increased the viewership of content 105 by comparing the viewership before and after the occurrence of an external event.

Going back to FIG. 2, after content aggregation system 135 completes step 240, report generator 160 uses the results of step 240 to generate a report. In an embodiment, a report may be in a graph or a table format. In another embodiment, the report may be displayed to user 170 as a web page. In another embodiment, the report may be available only to subscribed users 170. In another embodiment, the report may be generated only to users 170 who are associated with the provider hosting content aggregation system 135.

Figure 5A:
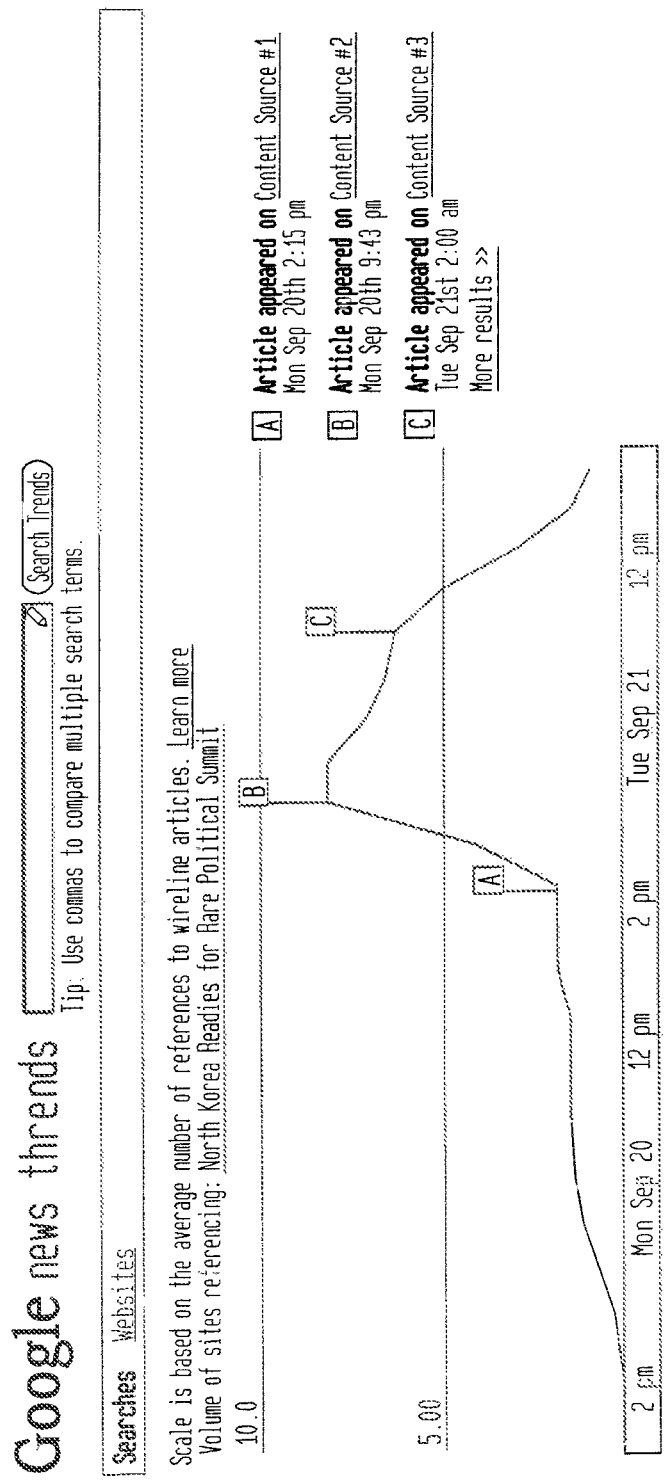
FIGS. 5A and 5B are exemplary embodiments 500 of the content tracking report.
Figure 5B:
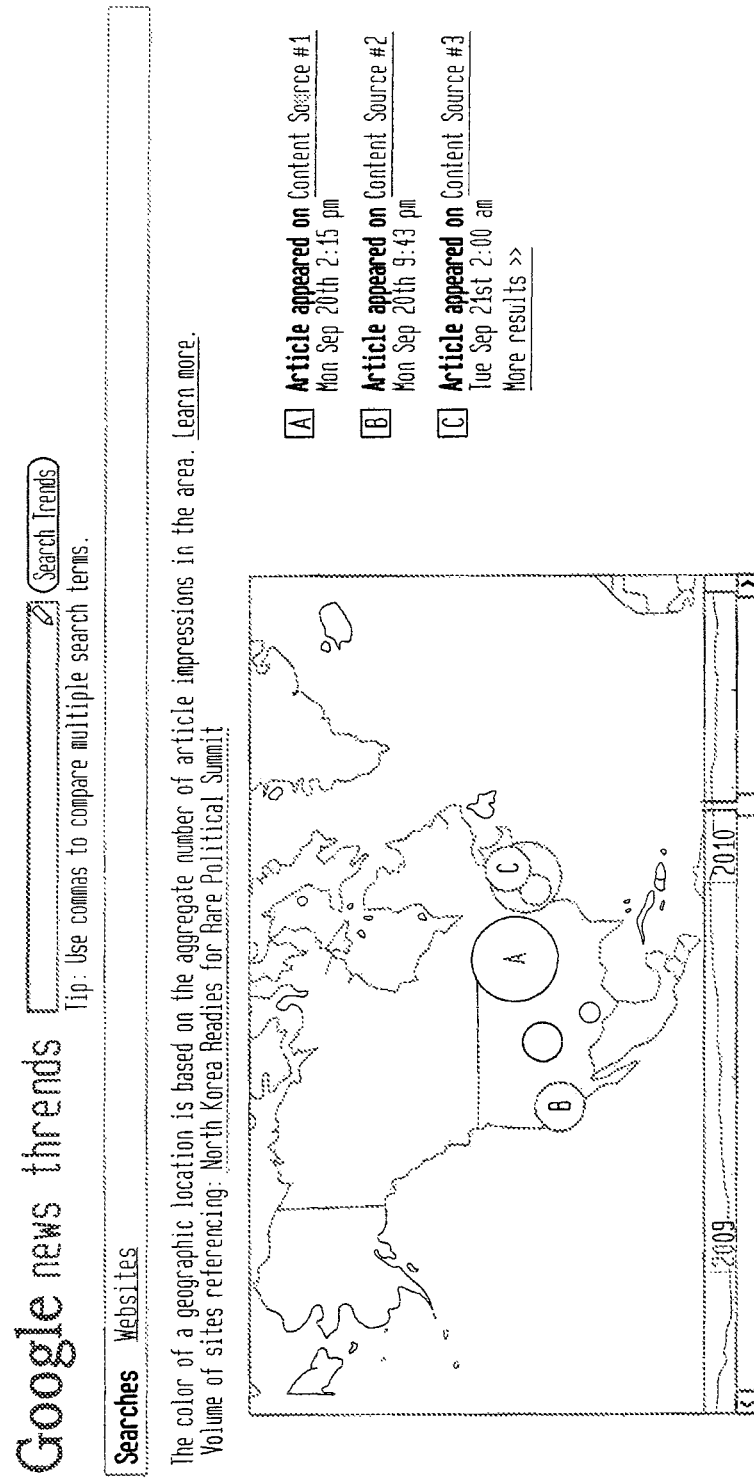

FIGS. 5A and 5B are graphs of exemplary embodiments of a content report generated by report generator 160. In FIGS. 5A and 5B content 105 is a news article titled "North Korea Readiness for Rare Political Summit."

In FIG. 5A the graph includes time on its x-axis and volume on its y-axis. The graph tracks the article and its appearance in various content sources, such as content source 1, content source 2 and content source 3. The graph also tracks the number of users that have logged on to view the article when it was published on content source 1, content source 2 and content source 3.

In FIG. 5B the graph shows content 105 that was viewed in several geographic areas. The graph includes an x-axis which demonstrates how the viewership varied with time in each geographic area. The size of the dot illustrates the aggregate number of people who viewed content in a particular geographic area at time t. Additionally, the content report shows the first time content 105 was viewed in the geographic area.

Figure 6:
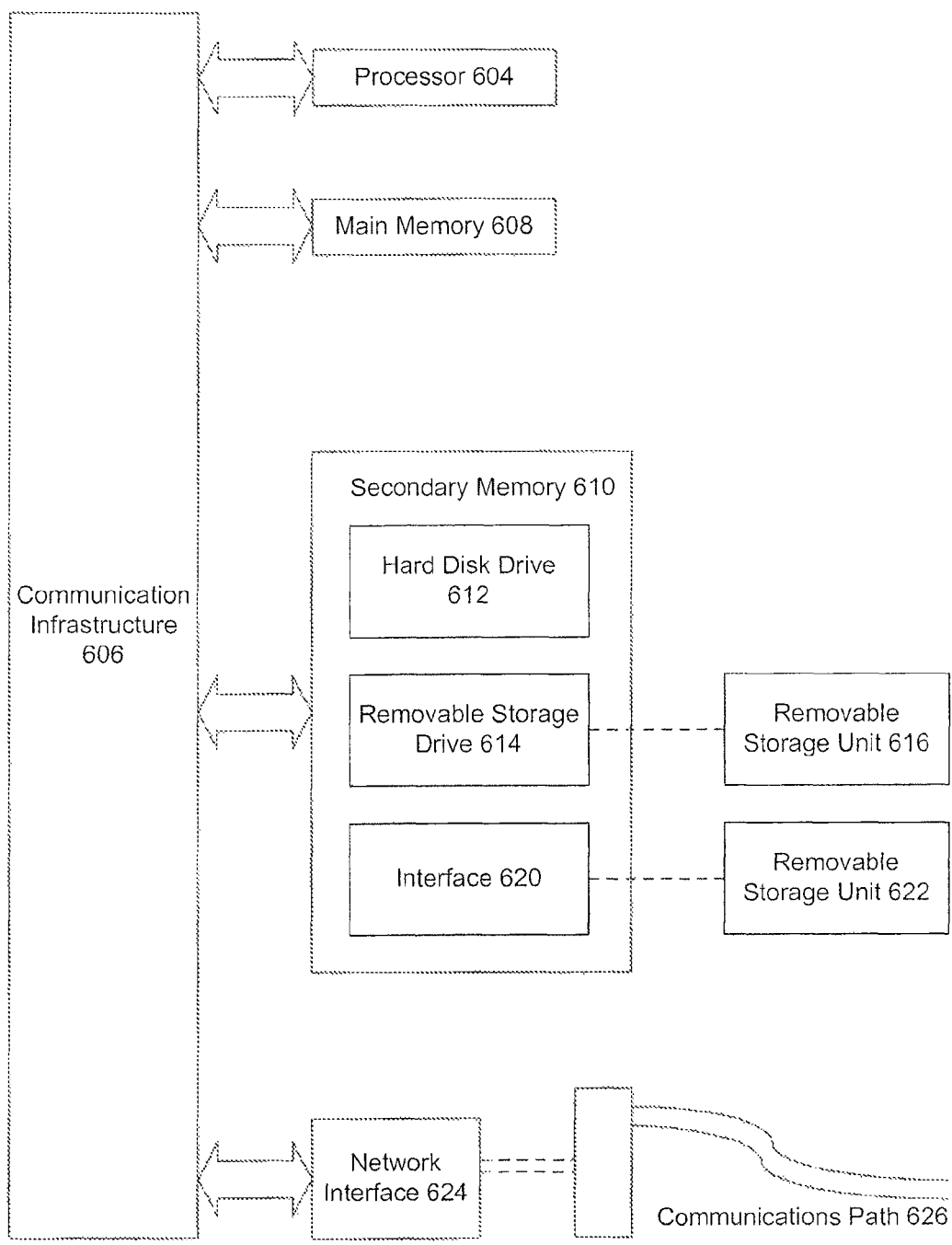
FIG. 6 is an exemplary embodiment of a computer system 600 in which embodiments of the invention may be implemented.

FIG. 6 illustrates an example computer system 600 in which embodiments of the present invention, or portions thereof, may by implemented as computer-readable code. For example, the components or modules of system 100, may be implemented in one or more computer systems 600 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 600. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. As will be appreciated by persons skilled in the relevant art, processor device 104 may also be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme.

Computer system 600 also includes a main memory 608, for example, random access memory (RAM), and may also include a secondary memory 610. Secondary memory 610 may include, for example, a hard disk drive 612, removable storage drive 614. Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. which is read by and written to by removable storage drive 614. As will be appreciated by persons skilled in the relevant art, removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 may be in the form of signals, which may be electronic, electromagnetic, optical, or other signals capable of being received by communications interface 624. These signals may be provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Computer program medium and computer usable medium may also refer to memories, such as main memory 608 and secondary memory 610, which may be memory semiconductors (e.g. DRAMs, etc.).

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor device 604 to implement the processes of the present invention, such as the stages in the method illustrated by flowcharts 200 of FIG. 2, 300 of FIGS. 3 and 400 of FIG. 4 discussed above. Accordingly, such computer programs represent controllers of the computer system 600. Where the invention is implemented using software, the software may be stored in a computer program product and loaded into computer system 600 using removable storage drive 614, interface 620, and hard disk drive 612, or communications interface 624.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for tracking content across the Internet, comprising:
 (a) configuring the content to include a unique content identifier at a content source; and (b) sending the content from the content source to a content aggregation system, wherein the content aggregation system aggregates and tracks, using the unique content identifier, content across a plurality of content sources, and wherein the content aggregation system determines, based on the unique content identifier, the amount of time between the content appearing in an original content source and being republished by the plurality of content sources.

2. The method of claim 1, wherein the unique content identifier is included in a metadata associated with the content.

3. The method of claim 1, further comprising:
(c) receiving content including the unique content identifier;
(d) republishing the content, wherein the unique content identifier remains constant during a lifetime of the content; and
(e) sending the republished content to the content aggregation system.

4. The method of claim 1, wherein the content aggregation system determines, based on the unique content identifier, at least one key word that increases the viewership of the content.

5. The method of claim 1, wherein the content aggregation system determines, based on the unique content identifier, a number of content sources that republished the content.

6. The method of claim 1, wherein the content aggregation system determines, based on the unique content identifier, if an external event influenced the popularity of the content.

7. The method of claim 1, wherein the content aggregation system determines, based on the unique content identifier, popularity of the content in a geographic area.

8. A system for tracking content across the Internet, comprising:
a content source configured to:
(a) configure the content to include a unique content identifier; and
(b) send the content to a content aggregation system, wherein the content aggregation system aggregates and tracks, using the unique content identifier, content across a plurality of content sources, and wherein the content aggregation system determines, based on the unique content identifier, the amount of time between the content appearing in an original content source and being republished by the plurality of content sources.

9. The system of claim 8, wherein the unique content identifier is included in a metadata associated with the content.

10. The system of claim 8, wherein the plurality of content sources are further configured to:
(c) receive content including the unique content identifier;
(d) republish the content, wherein the unique content identifier remains constant during a lifetime of the content; and
(e) send the republished content to the content aggregation system.

11. The system of claim 8, wherein the content aggregation system determines, based on the unique content identifier, at least one key word that increases the viewership of the content.

12. The system of claim 8, wherein the content aggregation system determines, based on the unique content identifier, a number of content sources that republished the content.

13. The system of claim 8, wherein the content aggregation system determines, based on the unique content identifier, if an external event influenced the popularity of the content.

14. The system of claim 8, wherein the content aggregation system determines, based on the unique content identifier, popularity of the content in a geographic area.

15. An article of manufacture including a non-transitory computer-readable medium having instructions stored thereon that, when executed by a computing device, cause said computing device to perform operations for tracking content across the Internet, comprising:
(a) configuring the content to include a unique content identifier at a content source; and
(b) sending the content from the content source to a content aggregation system, wherein the content aggregation system aggregates and tracks, using the unique content identifier, content across a plurality of content sources, wherein the content aggregation system determines, based on the unique content identifier, the amount of time between the content appearing in an original content source and being republished by the plurality of content sources.

16. The article of manufacture of claim 15, wherein the unique content identifier is included in a metadata associated with the content.

17. The article of manufacture of claim 15, further comprising:
(c) receiving content including the unique content identifier;
(d) republishing the content using multiple content sources wherein the unique content identifier remains constant during a lifetime of the content; and
(e) sending the republished content to the content aggregation system.

* * * * *